United States Patent
Liang et al.

(10) Patent No.: US 11,061,284 B2
(45) Date of Patent: Jul. 13, 2021

(54) ARRAY SUBSTRATE COMPRISING ELECTRODE HAVING PARALLEL STRAIGHT PORTIONS, DISPLAY PANEL, AND DISPLAY DEVICE

(71) Applicant: XIAMEN TIANMA MICRO-ELECTRONICS CO., LTD., Xiamen (CN)

(72) Inventors: Yujiao Liang, Wuhan (CN); Liting Fang, Xiamen (CN); Ankai Ling, Xiamen (CN); Yanping Yu, Xiamen (CN); Boping Shen, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 357 days.

(21) Appl. No.: 15/993,154

(22) Filed: May 30, 2018

(65) Prior Publication Data
US 2019/0235324 A1 Aug. 1, 2019

(30) Foreign Application Priority Data
Jan. 31, 2018 (CN) .......................... 201810098638.1

(51) Int. Cl.
*G02F 1/1337* (2006.01)
*G02F 1/1343* (2006.01)
(Continued)

(52) U.S. Cl.
CPC ...... *G02F 1/133707* (2013.01); *G02F 1/1368* (2013.01); *G02F 1/134336* (2013.01);
(Continued)

(58) Field of Classification Search
CPC .......... G02F 2001/133397; G02F 2001/13685; G02F 2201/122
See application file for complete search history.

(56) References Cited

U.S. PATENT DOCUMENTS

2010/0128208 A1\* 5/2010 Kurasawa ............. G02F 1/1323
349/106
2014/0125904 A1\* 5/2014 Choung ............ G02F 1/133345
349/43
(Continued)

FOREIGN PATENT DOCUMENTS

CN 104570514 A 4/2015
CN 103885260 B 1/2017
(Continued)

*Primary Examiner* — Paul C Lee
(74) *Attorney, Agent, or Firm* — Anova Law Group PLLC

(57) ABSTRACT

An array substrate, a display panel, and a display device are provided. The array substrate comprises a plurality of pixel regions in an array along intersected first and second directions. The pixel region includes at least three subpixel regions. At least one subpixel region serves as an adjustment-subpixel region. The subpixel region has a first electrode including at least two parallel first straight portions. Second straight portions and first connecting portions are connected to first and second ends of the first straight portions, respectively. The first electrode corresponding to the adjustment-subpixel region serves as an adjustment electrode. An opening is configured at an end between the at least two adjacent second straight portions corresponding to the adjustment electrode. An angle between extending direction of the first straight portion and the second direction is less than an angle between extending direction of the second straight portion and the second direction.

19 Claims, 15 Drawing Sheets

(51) Int. Cl.
*G02F 1/1368* (2006.01)
*G02F 1/1333* (2006.01)

(52) U.S. Cl.
CPC .... *G02F 1/13685* (2021.01); *G02F 1/133397* (2021.01); *G02F 1/134363* (2013.01); *G02F 2201/122* (2013.01); *G02F 2201/123* (2013.01)

(56) References Cited

U.S. PATENT DOCUMENTS

2014/0240629 A1* 8/2014 Zhou ................ G02F 1/134363
 349/43
2016/0291423 A1* 10/2016 Chang ............... G02F 1/133707
2018/0336829 A1* 11/2018 Peng ................ G02F 1/134309

FOREIGN PATENT DOCUMENTS

| CN | 106324936 A | 1/2017 |
| CN | 106773371 A | 5/2017 |
| CN | 107422549 A | 12/2017 |

* cited by examiner

103

104

42

43

ARRAY SUBSTRATE COMPRISING ELECTRODE HAVING PARALLEL STRAIGHT PORTIONS, DISPLAY PANEL, AND DISPLAY DEVICE

CROSS-REFERENCES TO RELATED APPLICATIONS

This application claims priority of Chinese Patent Application No. 201810098638.1, filed on Jan. 31, 2018, the entire contents of which are hereby incorporated by reference.

FIELD OF THE INVENTION

The present disclosure generally relates to the field of display technology and, more particularly, relates to an array substrate, a display panel, and a display device.

BACKGROUND

Liquid crystal display (LCD) equipment has been widely applied in various fields due to its advantages of small size, light weight, and low radiation, etc. LCD panel is the most important element of an LCD equipment. The working principle of LCD is: through the adjustment of a voltage applied to a liquid-crystal layer, changing a rotation degree of liquid-crystal molecules, thereby controlling a rotation direction of the polarized light and polarization states, and achieving the alteration of display states of LCD.

Moreover, touch screen technology has gradually replaced physical keyboard technology and becomes a mainstream technology for mobile terminals. With the touch-screen technology, when a finger or a pen touches a touch-screen installed in the front end of a display, the touched position (in the form of coordinates) is detected and sent to a CPU, which determines the inputted information. At present, the touchscreen has a wide range of applications. The main products include mobile terminals, such as touch-type mobile phones, notebook computers, and the human-machine display interfaces of automation industry, etc.

Generally, subpixel units of different colors are arranged on a display panel. In practice, the adjustment of color of a displayed picture is achieved by lowering the voltage applied at a pixel unit of a certain color. However, with a decrease in the applied voltage, the electric-field-induced torque exerted on the liquid crystal molecules is reduced, and liquid crystal response time is increased. This leads to an inconsistent response time for subpixel units of different colors. When the response time exceeds picture switching time and a page is dragged or moved, LCD motion artifacts (e.g., motion blur) can be observed. Due to the inconsistent response time for different colors, a character discoloration trail is prone to occur. And the larger the discrepancy in the response time of the subpixel units of different colors is, the more evident the discoloration trail will be, thereby significantly degrading user experience.

The disclosed array substrate, display panel, and display device thereof are directed to solve one or more problems set forth above and other problems.

BRIEF SUMMARY THE DISCLOSURE

One aspect of the present disclosure provides an array substrate. The array substrate comprises a plurality of pixel regions, arranged in an array along a first direction and a second direction. Each of the pixel regions includes at least three subpixel regions, among which at least one subpixel region serves as an adjustment-subpixel region. Each of the subpixel regions has a first electrode. The first direction and the second direction are intersected with each other. Each of the first electrodes includes at least two first straight portions parallel to each other, and second straight portions are respectively connected to each of the first straight portions, and the first electrode corresponding to the adjustment-subpixel region serves as an adjustment electrode. Each of the second straight portions is parallel to each other and is disposed at a first end of each of the first straight portions. A second end of each of the first straight portions is connected with a first connecting portion. An opening is configured at an end, away from the first straight portions, between the at least two adjacent second straight portions of the second straight portions corresponding to the adjustment electrode. An angle θ1 between an extending direction of the first straight portion and the second direction is less than an angle θ2 between an extending direction of the second straight portion of the adjustment electrode and the second direction.

Another aspect of the present disclosure provides a display panel. The display panel comprises: a color-film substrate; and an array substrate, arranged to be opposite to the color-film substrate. The array substrate comprises a plurality of pixel regions, arranged in an array along a first direction and a second direction. Each of the pixel regions includes at least three subpixel regions, among which at least one subpixel region serves as an adjustment-subpixel region. Each of the subpixel regions has a first electrode. The first direction and the second direction are intersected with each other. Each of the first electrodes includes at least two first straight portions parallel to each other, and second straight portions are respectively connected to each of the first straight portions, and the first electrode corresponding to the adjustment-subpixel region serves as an adjustment electrode. Each of the second straight portions is parallel to each other and is disposed at a first end of each of the first straight portions. A second end of each of the first straight portions is connected with a first connecting portion. An opening is configured at an end, away from the first straight portions, between the at least two adjacent second straight portions of the second straight portions corresponding to the adjustment electrode. An angle θ1 between an extending direction of the first straight portion and the second direction is less than an angle θ2 between an extending direction of the second straight portion of the adjustment electrode and the second direction.

Another aspect of the present disclosure provides a display device. The display device comprises a display panel including a color-film substrate and an array substrate arranged to be opposite to the color-film substrate. The array substrate comprises a plurality of pixel regions, arranged in an array along a first direction and a second direction. Each of the pixel regions includes at least three subpixel regions, among which at least one subpixel region serves as an adjustment-subpixel region. Each of the subpixel regions has a first electrode. The first direction and the second direction are intersected with each other. Each of the first electrodes includes at least two first straight portions parallel to each other, and second straight portions are respectively connected to each of the first straight portions, and the first electrode corresponding to the adjustment-subpixel region serves as an adjustment electrode. Each of the second straight portions is parallel to each other and is disposed at a first end of each of the first straight portions. A second, end of each of the first straight portions is connected with a first connecting portion. An opening is configured rat an end, away from the first straight portions, between the at least two adjacent second straight portions of the second straight portions corresponding to the adjustment electrode. An angle θ1 between an extending direction of the first straight portion and the second direction is less than an angle θ2 between an extending direction of the second straight portion of the adjustment electrode and the second direction.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
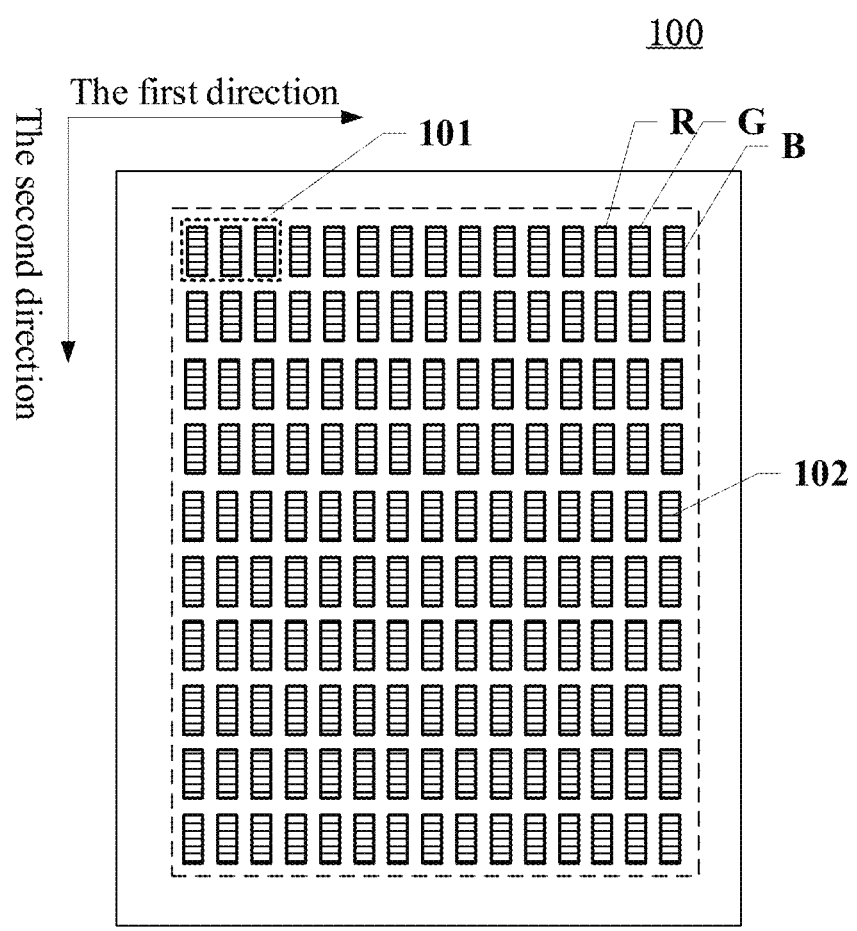
FIG. 1 illustrates a top view of an exemplary array substrate consistent with disclosed embodiments.

Certain terms are used throughout the description and claims to refer to particular components. Those skilled in the art should understand that hardware manufactures may use different terms to refer to the same component. The description and the claims do not use the difference in names as a means of distinguishing the components, but use the difference in the functions of the components as the criteria for differentiation. As used throughout the specification and claims, "comprising" is an open language and should the be interpreted as "including but not limited to". "Approximately" means that within an acceptable error range, those skilled in the art can solve the technical problem within the certain error range and basically can achieve the technical effect. Furthermore, the term "couple" hereby may include any direct and indirect electrical coupling manners. Hence, if a first device is described as being coupled to a second device, it represents that the first device can be directly electrically coupled to the second device, or indirectly electrically coupled to the second device through another device or a coupling manner. The following description of the specification illustrates the disclosed embodiments of the present disclosure; however, the description is intended to explain general principles of the present disclosure and is not intended to limit the scope of the present disclosure. The scope of protection of the present disclosure shall be subject to the terms of the appended claims.

In existing technologies, the adjustment of the displayed picture color of a display panel is achieved by reducing the voltage applied at a pixel unit of a certain color. As the voltage decreases, the electric-field-induced torque exerted on the liquid crystal molecules reduces, and their response time increases. This leads to an inconsistent response time for the subpixel units with different colors. After the response time exceeds the picture switching time, LCD motion artifacts (e.g., motion blur) can be observed upon a page being dragged or moved. Due to the inconsistent response time for different colors, a character discoloration trail is prone to occur. And the larger the discrepancy in the response time of the subpixel units of different colors is, the more evident the discoloration trail will be, thereby significantly degrading user experience.

In consideration of the above-mentioned problems, the present disclosure is to solve these technical problems by providing an array substrate, a display panel, and a display device. In an introduced adjustment-subpixel region, an opening may be configured at the end points, away from first straight portions, between the at least two adjacent second portions of second portions corresponding to adjustment electrodes. And an angle θ2, between an extending direction of the second straight portion and a second direction, may be set to be greater than an angle θ1, between an extending direction of the first straight portions and the second direction. Such design can effectively prevent the decrease of transmittance, and meanwhile can, speed up the pixel response time, lower the discrepancy in the response time among each subpixel, and improve the artifacts of motion blur and discoloration in the existing technologies.

Figure 2:
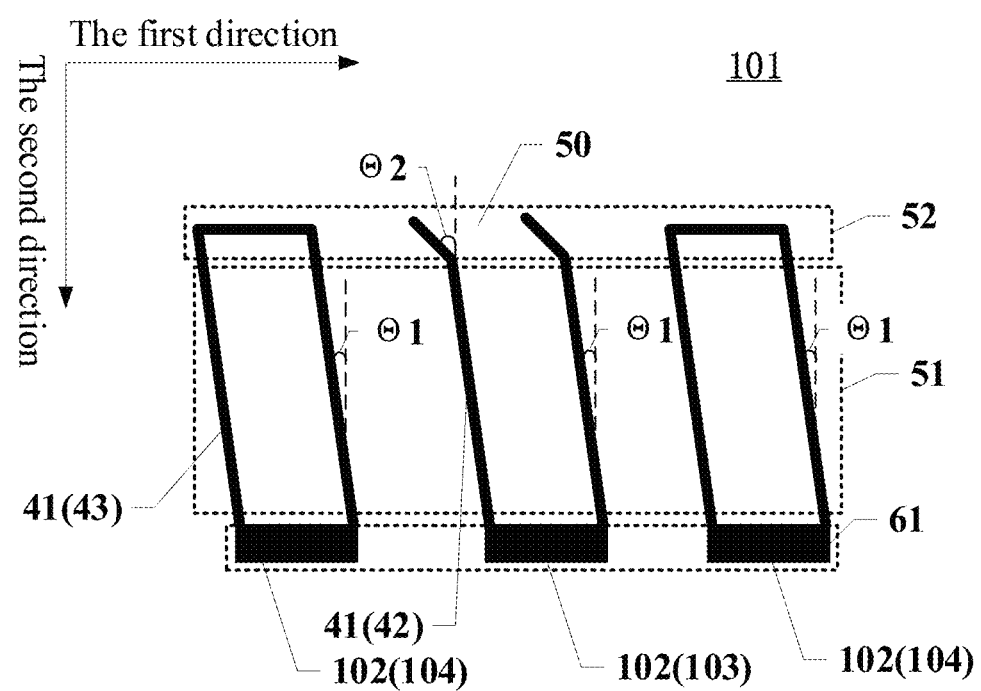
FIG. 2 illustrates a schematic structural diagram of an exemplary pixel region of an exemplary array substrate consistent with disclosed embodiments.

FIG. 1 illustrates a top view of an exemplary array substrate consistent with disclosed embodiments. FIG. 2 illustrates a schematic structural diagram of an exemplary pixel region of an exemplary array substrate consistent with disclosed embodiments. As shown in FIG. 1 and FIG. 2, the array substrate 100 consistent with the present disclosure includes a plurality of pixel regions 101, arranged in an array along a first direction and a second direction. Each of the pixel regions includes at least three subpixel regions 102. Each of the subpixel regions 102 is configured with a first electrode 41. The first direction intersects with the second direction.

Each of the first electrodes 41 includes at least two first straight portions 51 parallel to each other and a second straight portion 52 connected to each of the first straight portions 51. The second straight portions 52 of each of the first electrode 41 is parallel to each other and is disposed at a first end of each of the first straight portions 51, respectively. A second end of each of the first straight portions 51 is connected with a first connecting portion 61. There is an angle θ1, between an extending (Erection of the first straight portion 51 and the second direction.

Among the at least three subpixel regions 102 corresponding to each of the pixel regions 101, at least one subpixel region 102 is an adjustment subpixel region 103. The first electrode 41 corresponding to the adjustment subpixel region 103 is an adjustment electrode 42. An opening 50 is configured between at least two adjacent second straight portions 52 of the second straight portions corresponding to each of the adjustment electrodes 42 at an end away from the first straight portions 51. There is an angle, θ2, between an extending direction of the second straight portion 52 corresponding to the adjustment electrode 42 and the second direction, and θ1<θ2.

Referring to FIG. 1, specifically, a plurality of pixel regions 101 are arranged in an array along the first direction and the second direction on the array substrate 100. Each pixel region 101 includes three subpixel regions 102. The first direction and the second direction may be perpendicular to each other. In addition to this vertical arrangement, in another embodiment, the first direction and the second direction may also be intersected in other manners according to specific applications, which are not limited herein.

Referring to FIG. 2, each subpixel region 102 is configured with the first electrode 41. Each first electrode 41 includes two first straight portions 51 parallel to each other. A first end of the first straight portion 51 includes two second straight portions 52 parallel to each other, and the second straight portions 52 are connected to the first straight portions 51 in one-to-one correspondence. A second end of the first straight portions 51 is connected with a first connecting portion 61.

As shown in FIG. 2, the first straight portion 51 deviates from the second direction with a certain angle, and the angle, between the extending direction of the first straight portion 51 and the second direction, is θ1. Specifically, among the three subpixel regions 102 corresponding to the pixel region 101, one subpixel region 102 serves as the adjustment-subpixel region 103, and an opening 50 is configured at the end points, away from the first straight portions 51, between the two second straight portions 52 corresponding to the adjustment electrode 42 of the subpixel region 103. That is, at the end points (away from the first straight portions 51) of the second straight portions 52, no electrode structure is configured. Thus, the electric-field directions, generated between the mutually parallel second straight portions 52 and a common electrode, can be consistent, which allows the liquid crystal molecules to have a consistent rotation direction at the end points (away from the first straight portions 51) of the second straight portions 52. Compared to a top-enclosure structure, this opening is favorable to improve the transmittance of the adjustment-subpixel region 103.

Figure 3:
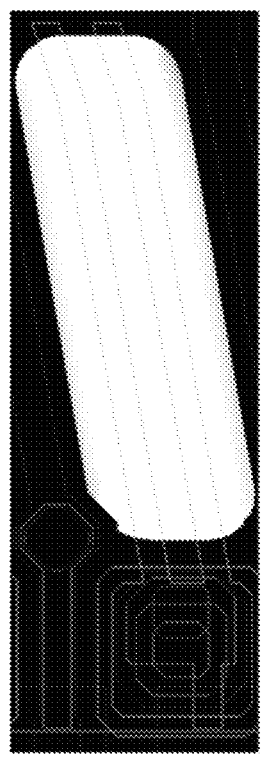
FIG. 3 illustrates a schematic simulation diagram of an exemplary adjustment-subpixel region of an exemplary array substrate consistent with disclosed embodiments.
Figure 4:
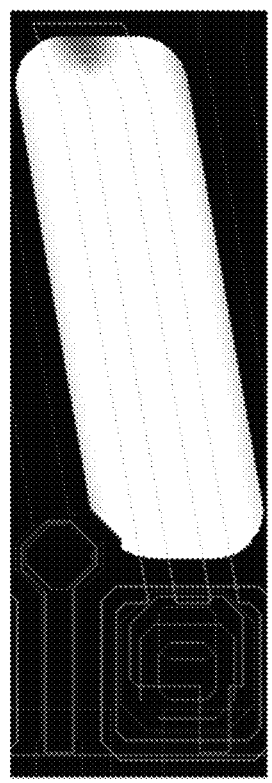
FIG. 4 illustrates a schematic simulation diagram of an exemplary non-adjustment-subpixel region of an exemplary array substrate consistent with disclosed embodiments.

Referring to FIG. 3 and FIG. 4, FIG. 3 illustrates a schematic simulation diagram of an exemplary adjustment-subpixel region of an exemplary array substrate consistent with disclosed embodiments, and FIG. 4 illustrates a schematic simulation diagram of an exemplary non-adjustment-subpixel region of an exemplary array substrate consistent with disclosed embodiments. As shown in FIG. 3, there is no shadow present on the top of the adjustment-subpixel region 103, which has a high transmittance. In contrast, as shown in FIG. 4, there is a shadow present on the top of the non-adjustment-subpixel region 104, which has a low transmittance.

Referring to FIG. 2, since in the non-adjustment-subpixel region 104, the end points (away from the first straight portions 51) of the second straight portions 52 are enclosed, and are configured with a horizontal electrode structure, the electric-field direction, generated between the horizontal electrode and the common electrode, is different from the electric-field direction, generated between the first straight portion 51 and the common electrode. As such, the rotation direction of the liquid crystal molecules corresponding to the top of the non-adjustment-subpixel region 104 is different from the rotation direction of the liquid crystal molecules corresponding to other regions, which leads to a reduced transmittance, and results in the shadow appearing on the top of the non-adjustment-subpixel region 104 (as shown in FIG. 4). Hence, if the adjustment subpixel region 103 consistent with the present disclosure is illuminated, compared to non-adjustment-subpixel regions 104, more lights from the opening 50 can pass through the adjustment-sub pixel region 103, improving the transmittance of the adjustment-subpixel region 103. Therefore, as required when displaying certain pictures, upon lowering the voltage of the adjustment-subpixel region 103, the electric-field-induced torque exerted on the liquid crystal molecules 30 is reduced. Although the voltage decreases, because of the opening 50 between the second straight portions 52 of the adjustment subpixel region 103, which helps to compensate for the reduced transmittance caused by the voltage decrease, the impact of decreasing the voltage on the overall transmittance of the array substrate 100 can be prevented.

Moreover, in one embodiment, the angle θ2, between the extending direction of the second straight portion 52 of the adjustment electrode 42 and the second direction, may be greater than the angle θ1, between the extending direct on of the first straight portion 51 and the second direction. Upon increasing the angle θ2, between the extending direction of the second straight portion 52 of the adjustment electrode 42 and the second direction, and θ2>θ1, the generated electric-field intensity corresponding to the adjustment-subpixel region 103 can be increased, thus increasing the voltage that can cause the rotation of the liquid crystal molecules. Thus, after the torque induced by the externally applied voltage (i.e., the voltage that rotates the liquid crystal molecules) counteracts the elastic resistance of the liquid crystal molecules, the residual torque can cause the rotation of the liquid crystal molecules. The larger the applied voltage is, the faster the liquid crystal molecules rotate, and the fluster the response time of the corresponding subpixel regions become. Hence, the discrepancy in the response time among the subpixel regions 102 of different colors can be reduced, thereby effectively preventing motion blur and discoloration when dragging or moving a page and a character, and significantly improving the display quality of the array substrate 100 and enhancing the user experience.

Optionally, referring to FIG. 2, in each of the first electrodes 41 consistent with the present disclosure, the angle θ1 between the extending direction of the first straight portion 51 and the second direction may be set as 6°≤θ1≤14°, and in the adjustment electrode 42, the angle θ2 between the extending direction of the second straight portion 52 and the second direction may be set as θ2>14°. By using such design of the angle θ1 between the extending direction of the first straight portion 51 and the second direction, and the angel θ2 between the extending direction of the second straight portion 52 and the second direction, together with the design of the adjustment electrode 42 having a non-enclosed structure, the response time of the subpixel region 102 corresponding to the adjustment-electrode 42 can be reduced to some extent, and the discrepancy in the response time among the subpixel regions 102 of different colors can be reduced, thereby effectively preventing motion blur and discoloration when dragging or moving a page and a character, and significantly improving the display quality of the array substrate 100 and enhancing the user experience.

Optionally, referring to FIG. 2, in the adjustment electrode 42 consistent with the present disclosure, the angle θ2 between the extending direction of the second straight portion 52 and the second direction may be set to θ2=20°. By means of numerous simulation tests, data are obtained and given in the following Table 1 and Table 2. Table 1 and Table 2 represent comparison data of the simulated response time and the simulated transmittance, respectively, between the non-adjustment electrode 43 and the adjustment, electrode 42. In the adjustment electrode 42, the angle θ2 between the extending direction of the second straight portion 52 and the second direction is set to different values. The angle θ1 between the extending direction of the first straight portion 51 and the second direction is set as θ1=10°. In the non-adjustment electrode 43, there is an enclosure at the end points (away from the first straight portions 51) of the second straight portions 52, and the second straight portions 52 are aligned with the first straight portions 51.

TABLE 1

Comparison of simulated response time

| Simulated results | θ2 | GTG MAX unit:ms | Ton + Toff unit:ms |
|---|---|---|---|
| Non-adjustment electrode | θ2 = 10° | 40.3 | 29.5 |
| Adjustment electrode | θ2 = 14° | 39.4 | 28.6 |
|  | θ2 = 17° | 38.9 | 28.5 |
|  | θ2 = 20° | 38.6 | 28.5 |

TABLE 2

Comparison of simulated transmittance

| Simulated results | θ2 | TR | Increasing rate of TR |
|---|---|---|---|
| Non-adjustment electrode | θ2 = 10° | 3.34% | — |
| Adjustment electrode | θ2 = 14° | 3.26% | −2.4% |
|  | θ2 = 17° | 3.25% | −2.7% |
|  | θ2 = 20° | 3.37% | 0.9% |
|  | θ2 = 25° | 3.35% | 0.3% |
|  | θ2 = 30° | 1.34% | 0 |

Figure 5:
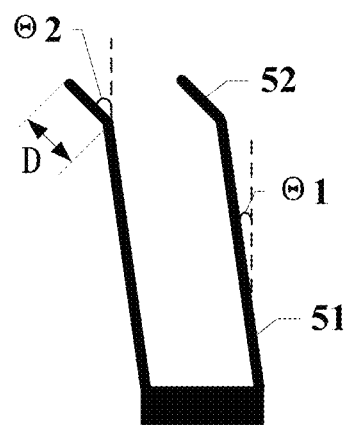
FIG. 5 illustrates a schematic structural diagram of an exemplary adjustment electrode consistent with disclosed embodiments.
Figure 6:
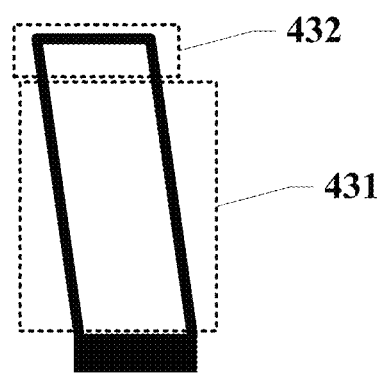
FIG. 6 illustrates a schematic structural diagram of a normal non-adjustment electrode.

In Table 1, GTG MAX represents the maximum value of gray-level response time, Ton represents the response time switching from a black picture to a white picture, Toff represents the response time switching from the white picture to the black picture, and TR represents the transmittance, the adjustment electrode and the non-adjustment electrode listed in Table 1 and Table 2 can be referred to FIG. 5 and FIG. 6, respectively FIG. 5 illustrates a schematic structural diagram of an exemplary adjustment electrode consistent with disclosed embodiments, and FIG. 6 illustrates a schematic structural diagram of a normal non-adjustment electrode.

It can be seen from the simulated results of Table 1 that, in the case of the adjustment electrode having θ2=14°, compared to the non-adjustment electrode having 2=10°, the gray-level response time (GTG MAX) is raised by 40.3−39.4=0.9 ms, and the response time (Ton+Toff), switching from the white picture to the black picture and switching back from the black picture to the white picture, is increased by 29.5−28.6=0.9 ms. In the case of the adjustment electrode having θ2=17°, compared to the non-adjustment electrode having θ2=10°, the gray-level response time (GTG MAX) is raised by 40.3−38.9=1.4 ms, and the response time (Ton+Toff), switching from the white picture to the black picture and switching back from the black picture to the white picture, is, increased by 29.5−28.5=1 ms. In the case of the adjustment electrode having θ2=20°, compared to the non-adjustment electrode having θ2=10°, the gray-level response time (GTG MAX) is raised by 40.3−38.6=1.7 ms, and the response time (Ton+Toff), switching from the white picture to the black picture and switching back from the black picture to the white picture, is increased by 29.5−28.5=1 ms.

Referring to the data listed in Table 2, when θ2=14° and θ2=17°, there are no improvements in the transmittance. When θ2=20°, the increasing rate of the transmittance can reach the largest value of 0.9%. However, upon continuing to increase the angle θ2, the increasing rate of the transmittance shows a downward trend. In a word, referring to Table, 1 and Table. 2, when θ2=20°, the grey-level response time (GTG MAX) and the response time (Ton+Toff), switching from the white picture to the black picture and switching back from the black picture to the white picture, have the highest increasing rates. Therefore, upon setting the angle θ2, between the extending direction of the second straight portion 52 of the adjustment electrode 42 and the second direction, as θ2=20°, the response time of the seal pixel region 102 having the adjustment electrode 42 can be evidently expedited, and the discrepancy in the response time among the subpixel regions 102 of different colors can be significantly lowered, which also can significantly improve the overall transmittance of the array substrate 100, can effectively prevent motion blur and discoloration when dragging or moving a page or a character on the array substrate, and can considerably enhance the user experience.

Optionally, referring to FIG. 5 again, in each of the pixel regions 101 on the array substrate 100 consistent with the present disclosure, the length D of the second straight portion 52 of the adjustment electrode 42 may be set as 3 μm≤D≤8 μm. Since during displaying by the array substrate, in the adjustment electrode 42, the length of the second straight portion 52 and the angle of deviation from the second direction would affect the transmittance of the array substrate and the response time of the subpixel regions, under the precondition of θ2>θ1 (i.e., the angle between the extending direction of the second straight portion 52 and the second direction is larger than the angle, between the extending direction of the first straight portion 51 and the second direction), setting the length D of the second straight portion 52 of the adjustment electrode 42 as 3 μm≤D≤8 μm can facilitate to improve the overall transmittance of the array substrate 100.

Optionally, the length D of the second straight portion 52 of the adjustment electrode 42 may be set as D=5 μm. When the length D of the second straight portion 52 of the adjustment electrode 42 is set as D=5 μm, the angle θ2 between the extending direction of the second straight portion 52 and the second direction is set as θ2=20°, and the angle θ1 between the extending direction of the first straight portion 51 and the second direction is set as θ1=10°, as the voltage of the adjustment electrode 42 corresponding to the adjustment subpixel region 103 decreases, without reducing the overall transmittance of the array substrate 100, the response time of the adjustment subpixel region can be shortened, and the discrepancy in the response time among each of the subpixel regions can be lowered.

Optionally, in any of the second straight portions 52 corresponding to the adjustment electrode 42, the opening 50 may be configured at the end points (away from the first straight portions 51) between any two adjacent second straight portions 52.

Specifically, the first electrode 41 includes two first straight portions 51 parallel to each other, and correspondingly includes two second straight portions 52 connected to the two first straight portions 51, respectively. In addition to this configuration, the first electrode 41 may also include a plurality of the first straight portions 51 and a plurality of the second straight to portions 52. The number of the first straight portions 51 and the number of the second straight portions 52 included in the first electrode 41 are not limited herein.

Figure 7:
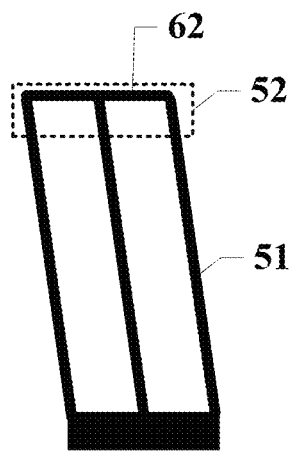
FIG. 7 illustrates a schematic structural diagram of an exemplary first electrode consistent with disclosed embodiments.
Figure 8:
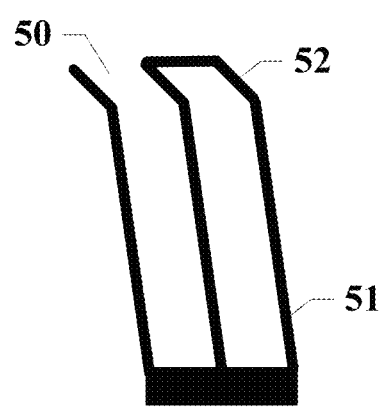
FIG. 8 illustrates another schematic structural diagram of an exemplary first electrode consistent with disclosed embodiments.
Figure 9:
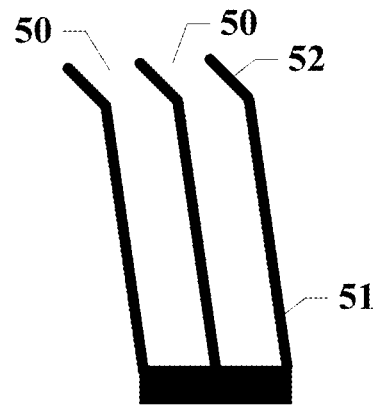
FIG. 9 illustrates another schematic structural diagram of an exemplary first electrode consistent with disclosed embodiments.

For example, FIG. 7 illustrates a schematic structural diagram of an exemplary first electrode consistent with disclosed embodiments, FIG. 8 illustrates another schematic structural diagram of an exemplary first electrode consistent with disclosed embodiments, and FIG. 9 illustrates another schematic structural diagram of an exemplary first electrode consistent with disclosed embodiments.

In the embodiments shown in FIGS. 7-9, each of the first electrodes 41 includes three first straight portions 51 parallel to each other, and three second straight portions 52 parallel to each other. In FIG. 7, the end points (away from the first straight portions 51) of the adjacent second straight portions 52 are connected with the second connecting portion 62. In FIG. 8, an opening 50 is configured at the end points (away from the first straight portions 51) of a pair of the adjacent second straight portions 52. Compared to the structure having each of the second straight portions 52 enclosed, the opening 50 configured as shown in FIG. 8 ran improve the overall transmittance of the array substrate 100. In the embodiment shown in FIG. 9, an opening 50 is configured, respectively, at the end points of each pair of the adjacent second straight portions 52, which can be more favorable to improve the overall transmittance of the array substrate IOU than the structure having each of the second straight portions 52 enclosed. It should be noted that in the adjustment electrode 42, as long as any two adjacent second straight portions 52 are configured with the opening 50 at the end points away from the first straight portions 51, the overall transmittance of the array substrate 100 can be improved. The number and the position, of the opening 50 are not limited herein.

Figure 10:
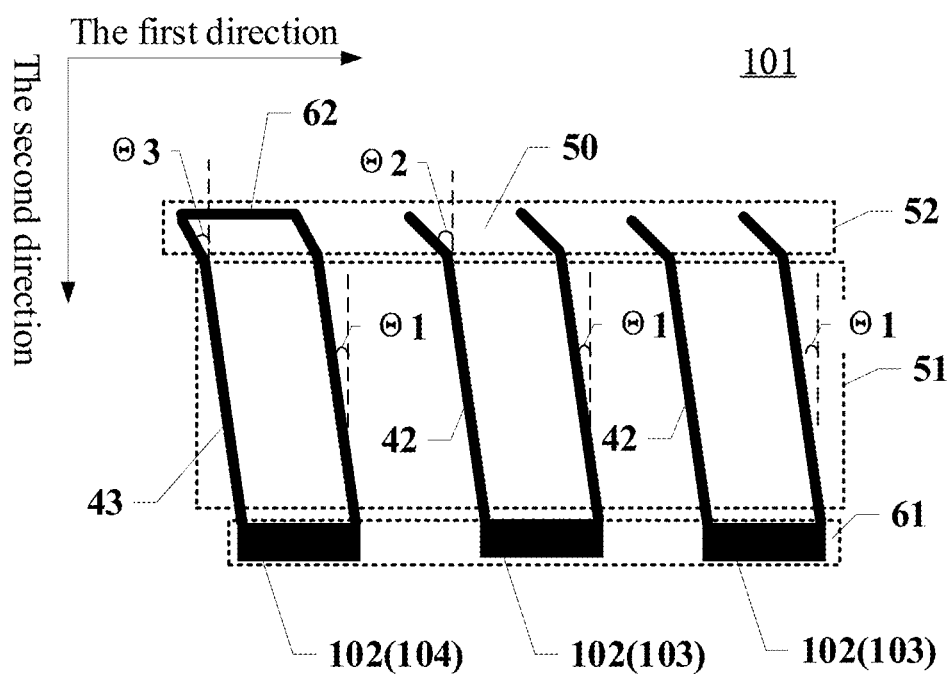
FIG. 10 illustrates a schematic structural diagram of an exemplary pixel region of an exemplary array substrate consistent with disclosed embodiments.
Figure 11:
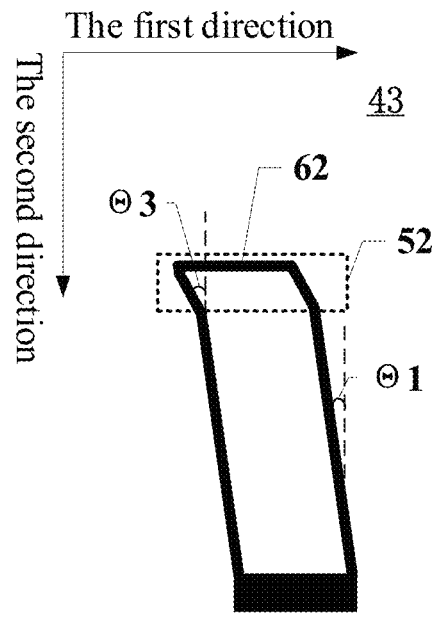
FIG. 11 illustrates a schematic structural diagram of an exemplary non-adjustment electrode of an exemplary array substrate consistent with disclosed embodiments.

Optionally, FIG. 10 illustrates a schematic structural diagram of an exemplary to pixel region of an exemplary array substrate consistent with disclosed embodiments, and FIG. 11 illustrates a schematic structural diagram of an exemplary non-adjustment electrode of an exemplary array substrate consistent with disclosed embodiments. Referring to FIG. 10 and FIG. 11, in the three subpixel regions 102 corresponding to each of the pixel regions 101, at least one subpixel region 102 may serve as the non-adjustment-subpixel region 104. The first electrode corresponding to the non-adjustment-subpixel region 104 may serve as the non-adjustment electrode 43, and the angle, between the extending direction of the second straight portion 52 of the non-adjustment electrode 43 and the second direction, is θ3, and θ3<θ2.

Specifically, referring to FIG. 10, one pixel region 101 shown in FIG. 10 includes three subpixel regions 102. One of the three subpixel regions 102 may serve as the non-adjustment-subpixel region 104, and the other two subpixel regions 102 may serve as the adjustment-subpixel regions 103. In addition to this arrangement, according to requirements, one pixel region 101 may include two non-adjustment-subpixel regions 104 and one adjustment-subpixel region 103, which is not limited herein. Referring to FIG. 11, the angle, deviated from the extending direction of the second straight portion 52 of the non-adjustment electrode 43 to the second direction, is θ3. To speed up the response time of the subpixel region 102 corresponding to the adjustment electrode 42, the angel θ2, between the extending direction of the second straight portion 52 of the adjustment electrode 42 and the second direction, needs to be larger than the angle θ3, between the extending direction of the second straight portion 52 of the non-adjustment electrode 43 and the second direction.

Figure 12:
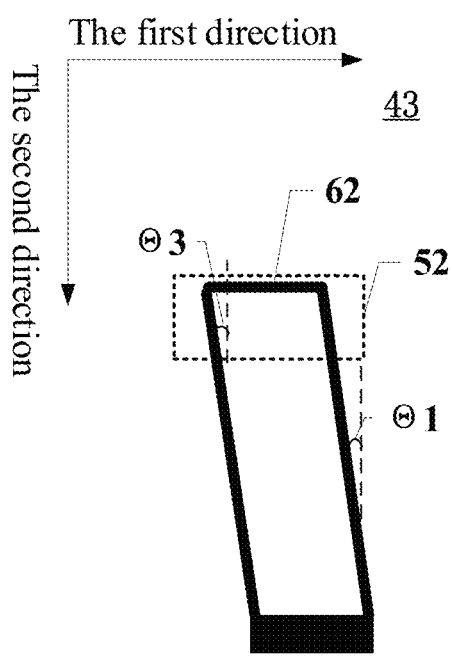
FIG. 12 illustrates another schematic structural diagram of an exemplary non-adjustment electrode of an exemplary array substrate consistent with disclosed embodiments.

Optionally, FIG. 12 illustrates another schematic structural diagram of an exemplary non-adjustment electrode of an exemplary array substrate consistent with disclosed embodiments. In this embodiment, θ3 may be set to be equal to θ1, i.e., θ3=θ1. That is, in the present disclosure, the extending direction of the second straight portion 52 of the non-adjustment electrode 43 may be set to coincide with the extending direction of the first straight portion 51, and the second straight portion 52 may be aligned with the first straight portion 51, which allows the fabrication of the first straight portion 51 and the second straight portion 52 to be completed at one time, without the need of separately measuring the angle, deviated from the second straight portion 52 to the second direction, thus simplifying the production of the non-adjustment electrode 43.

Optionally, referring to FIGS. 10-12, each of the second straight portions 52 of the non-adjustment electrode 43 may be connected with the second connecting portion 62. When there is no need to adjust the subpixel region 102 having a certain color, the electrode corresponding to the non-adjustment-subpixel region 104 may serve as the non-adjustment electrode 43. Generally, the end points (away from the first straight portions 51) of the second straight portions 52 of the non-adjustment electrode 43 are enclosed, that is, the second straight portions 52 are connected with the second connecting portion 62.

Figure 13:
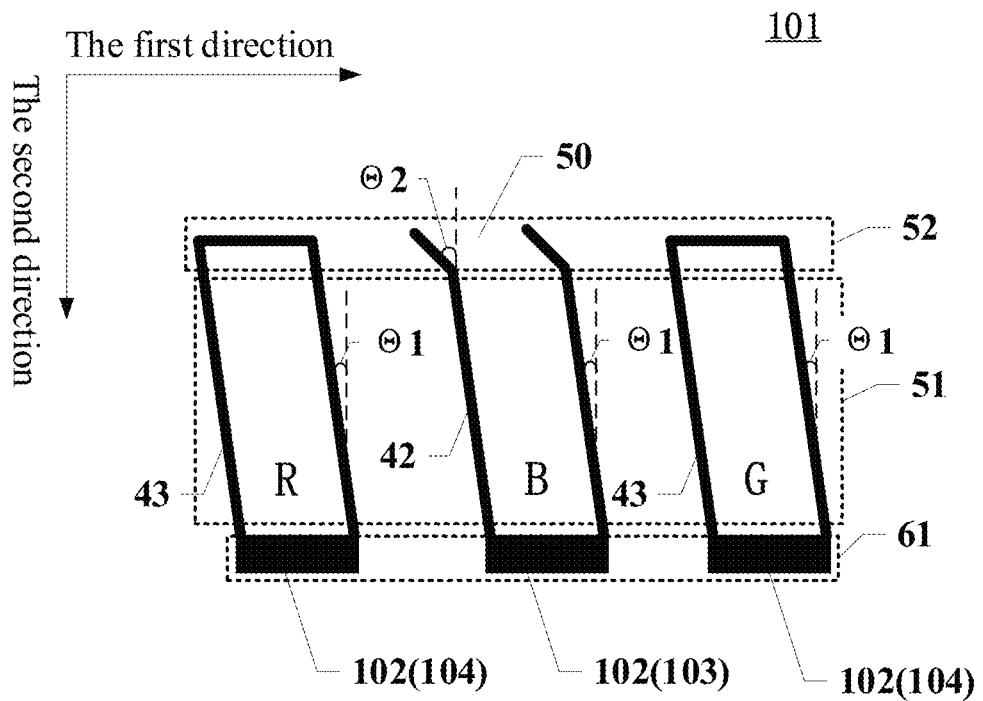
FIG. 13 illustrates a schematic structural diagram of an exemplary pixel region consistent with disclosed embodiments.

Optionally, FIG. 13 illustrates a schematic structural diagram of an exemplary pixel region consistent with disclosed embodiments. The pixel region 101 includes a red subpixel region R, a blue subpixel region B, and a green subpixel region G. Through combination of the red, blue, and green colors as the three primary colors, a variety of colors can be formed, to meet the display requirements of colors during displaying by the array substrate 100.

Figure 14:
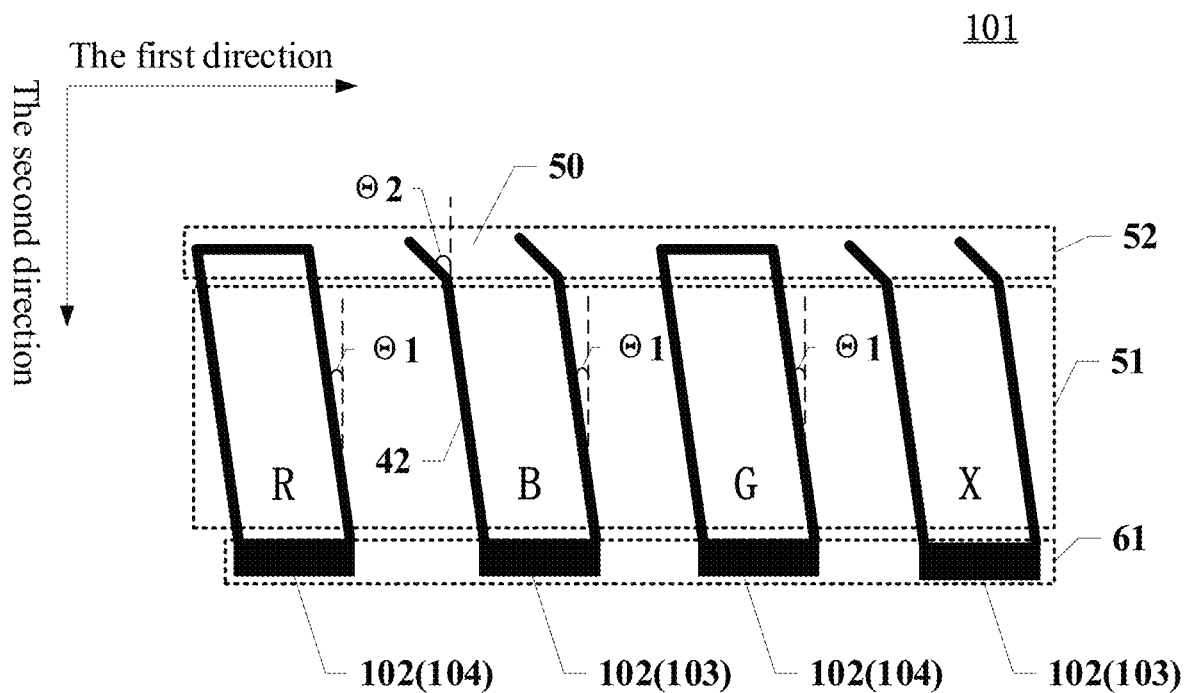
FIG. 14 illustrates another schematic structural diagram of an exemplary pixel region consistent with disclosed embodiments.

Optionally, FIG. 14 illustrates another schematic structural diagram of an exemplary pixel region consistent with disclosed embodiments. The pixel region 101 includes a red subpixel region R, a blue subpixel region B, a green subpixel region G, and a fourth-color subpixel region X. According to the display requirements of the array substrate 100, in the pixel region 101, in addition to the red R, blue B, and green G subpixel regions, the fourth-color subpixel region X may be introduced to improve the display effect of the array substrate 100.

Figure 15:
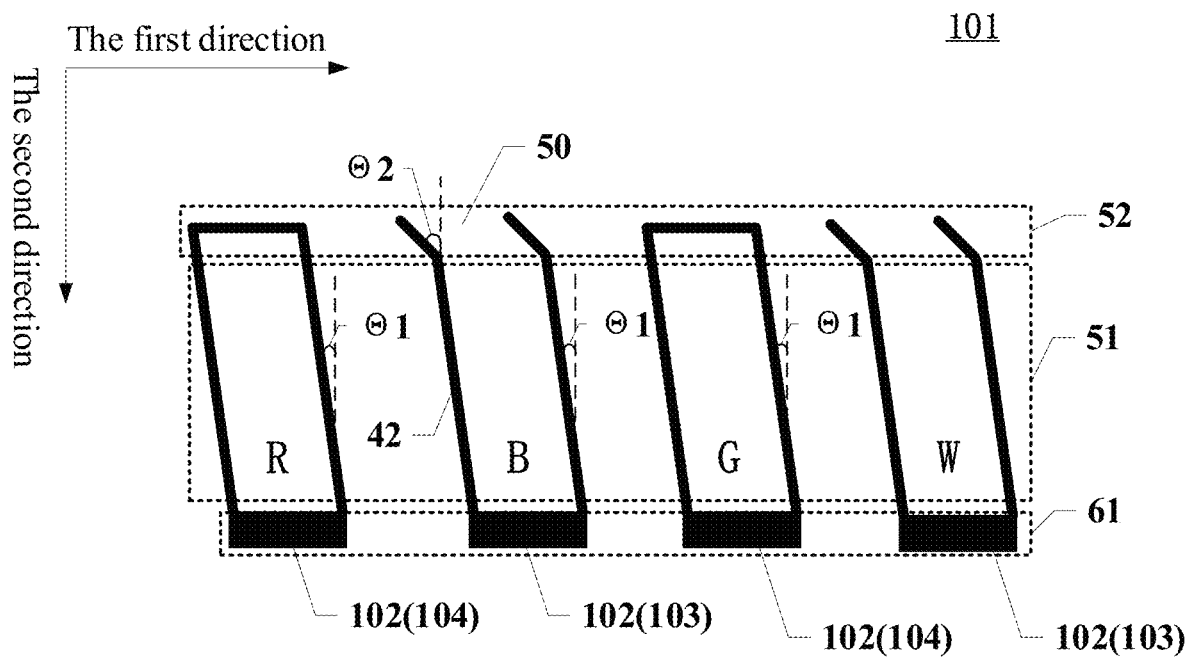
FIG. 15 illustrates another schematic structural diagram of an exemplary pixel region consistent with disclosed embodiments.

Optionally, FIG. 15 illustrates another schematic structural diagram of an exemplary pixel region consistent with disclosed embodiments. The fourth-color subpixel region 102 shown in FIG. 15 is a white subpixel region W. On the basis of the red R, blue B, and green G subpixel regions, introduction of the white subpixel region W can facilitate to improve the overall brightness of the picture displayed by the array substrate 100.

It should be noted that in addition to using the white subpixel region W as the fourth-color subpixel region 102, subpixel regions having other colors may also be used as the fourth-color subpixel region 102, which is not limited herein.

Optionally, when the pixel region 101 consistent with the present disclosure includes the white subpixel region W, for example, in the embodiment shown in FIG. 15, the white subpixel region W may be preferably selected as the adjustment-subpixel region. By controlling the voltage of the white subpixel region W, adjusting the brightness of the picture displayed by the array substrate 100 can be achieved.

Optionally, referring to FIG. 13, in the array substrate 100 consistent with the present disclosure, the pixel, region 101 may include at least one adjustment-subpixel region 103 and at least one non-adjustment-subpixel region 104. That is, in each pixel region 101 on the array substrate 100, both the adjustment-subpixel region 103 and the non-adjustment-subpixel region 104 may be included. The adjustment-subpixel region 103 may employ the adjustment electrode 42, while the non-adjustment-subpixel region 104 may employ the non-adjustment electrode 43. When it is needed to reduce the voltage of the subpixel region 103, the design of the adjustment electrode 42 consistent with the present disclosure can facilitate to expedite the response time of the subpixel region 103, and can lower the discrepancy in the response time between the adjustment subpixel region 103 and the non-adjustment-subpixel region 104. Meanwhile, the design of the opening 50 in the adjustment electrode 42 can further compensate the transmittance of the adjustment subpixel region 103, thus not causing an impact on the overall transmittance of the array substrate 100.

Optionally, referring to FIG. 13, in this embodiment, the blue subpixel region B may serve as the adjustment-subpixel region 103, while the red subpixel region R and the green subpixel region G may serve as the non-adjustment-subpixel regions 104. For achieving an eye-protection mode for the array substrate 100, by appropriately reducing the intensity of blue light of the array substrate 100, this can be realized. In this case, the blue subpixel region B may serve as the adjustment-subpixel region 103, and the electrode corresponding to the blue subpixel region B may serve as the adjustment electrode 43. As the voltage corresponding to the blue subpixel region 103 reduces, the transmittance corresponding to the blue subpixel region B would decrease. In one embodiment, the top of the adjustment electrode 42 corresponding to the blue subpixel region B may be contrived in the form of a non-enclosed end, that is, an opening 50 may be contrived at the end points (away from the first straight portions 51) of the second straight portions 52 of the adjustment electrode 42, thereby improving the transmittance of the blue subpixel region B, compensating for the reduced transmittance with decrease in the voltage, and preventing the impact of reducing voltage on the overall transmittance of the array substrate 100.

Furthermore, since in the adjustment electrode 42 corresponding to the blue subpixel region B, the angle θ2, between the extending direction of the second straight portion 52 and the second direction, is greater than the angle θ1, between the extending direction of the first straight portion 51 and the second direction, the response time of the blue subpixel region B can be expedited, the discrepancy in the response time, among the blue subpixel region B, the green subpixel region G and the red-green subpixel region 102, can be reduced, thus improving the artifacts of motion blur and discoloration in the existing technologies and enhancing the user experience.

Figure 16:
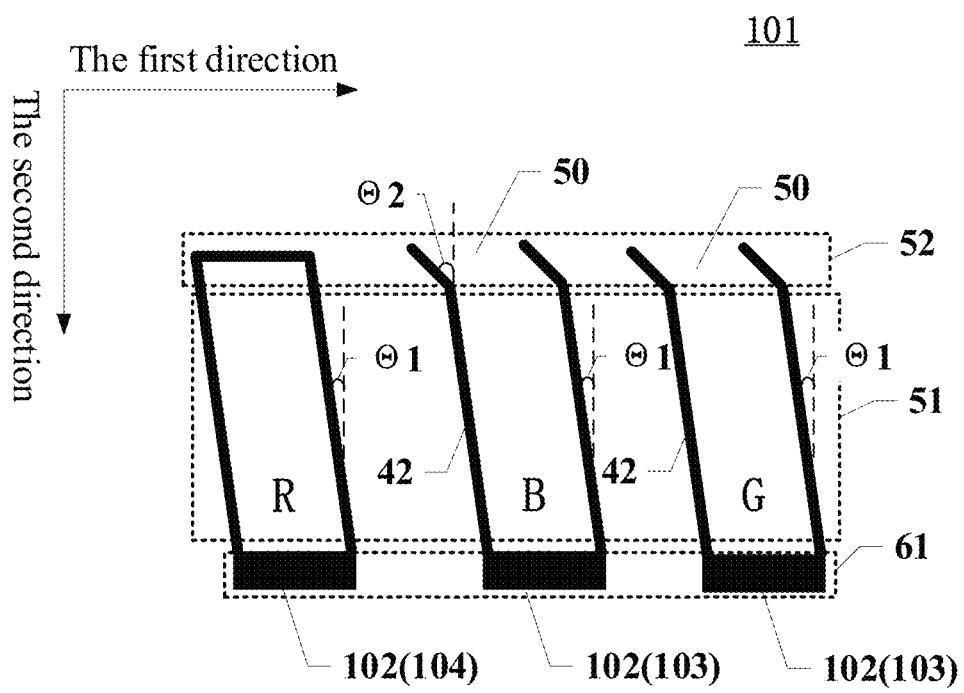
FIG. 16 illustrates another schematic structural diagram of an exemplary pixel region consistent with disclosed embodiments.

Optionally, FIG. 16 illustrates another schematic structural diagram of an exemplary pixel region consistent with disclosed embodiments. In one embodiment, the blue subpixel region B and the green subpixel region G may serve as the adjustment-subpixel regions 103, while the red subpixel region R may serve as the non-adjustment-subpixel region 104. When it is needed to adjust the brightness of the blue subpixel region B and the green subpixel region G, for example, by decreasing the voltages of the blue subpixel region B and the green subpixel region G, the brightness of the blue subpixel region B and the green subpixel region G can be reduced, causing the picture displayed by the array substrate 100 to be orange-yellow. Upon reducing the voltages corresponding to the blue subpixel region B and the green subpixel region G, the transmittances corresponding to the blue subpixel region B and the green subpixel region G would be lowered. In one embodiment, the tops of the adjustment electrodes 42 corresponding to the blue subpixel region B and the green subpixel region G may be contrived in the form of non-enclosed ends, that is, openings 50 may be contrived at the end points (away from the first straight portions 51) of the second straight portions 53 of the adjustment electrode 42, thereby improving the transmittances of the blue subpixel region B and the green subpixel region compensating for the reduced transmittance with decrease in the voltage, and preventing the impact of reducing the voltage on the overall transmittance of the array substrate 100.

Moreover, since in the adjustment electrodes 43 corresponding to the blue subpixel region B and the green subpixel region G, the angle θ2, between the extending direction of the second straight portion 52 and the second direction, is greater than the angle θ1, between the extending direction of the first straight portion 51 and the second direction, the response time of the blue subpixel region B can be expedited, the discrepancy in the response time, among the blue subpixel region B, the green subpixel region G and the red-green subpixel region 102, can be reduced, thus improving the artifacts of motion blur and discoloration in the existing technologies and enhancing the user experience.

Figure 17:
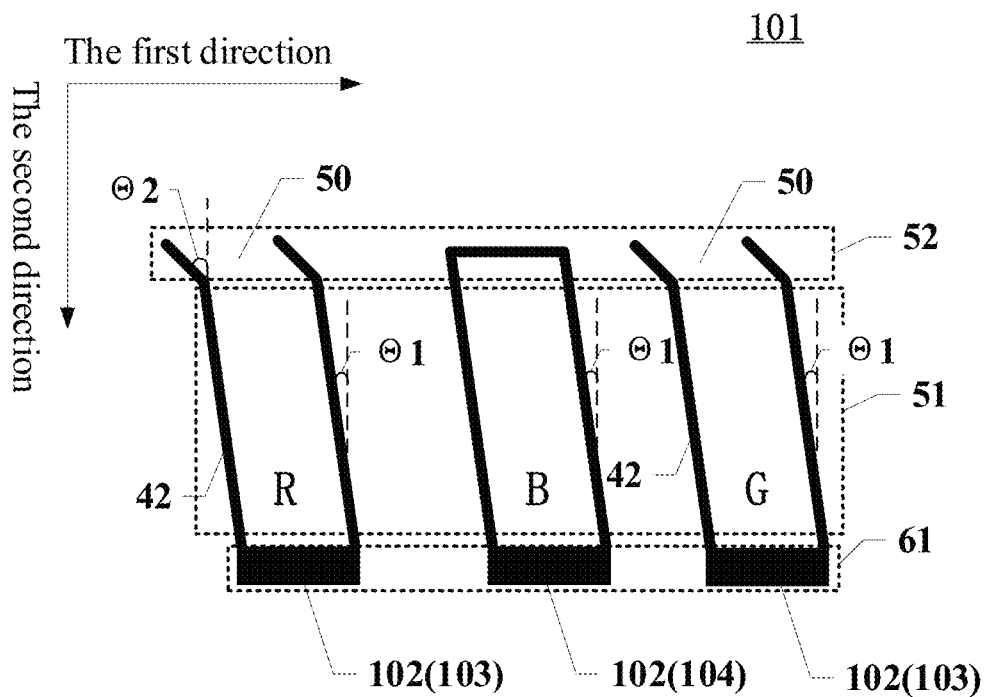
FIG. 17 illustrates another schematic structural diagram of an exemplary pixel region consistent with disclosed embodiments.

Optionally, FIG. 17 illustrates another schematic structural diagram of an exemplary pixel region consistent with disclosed embodiments. In one embodiment, the red subpixel region R and the green subpixel region G may serve as the adjustment-subpixel regions 103, while the blue subpixel region B may serve as the non-adjustment-subpixel region 104. When it is needed to adjust the brightness of the red subpixel region R and the green subpixel region G, for example, by decreasing the voltages of the red subpixel region R and the green subpixel region G, the brightness of the red subpixel region R and the green subpixel region G can be reduced, causing the picture displayed by the array substrate 100 to be bluish purple. Upon reducing the voltages corresponding to the red subpixel region R and the green subpixel region G, the transmittances corresponding to the red subpixel region R and the green subpixel region G would be lowered. In one embodiment, the tops of the adjustment electrodes 42 corresponding to the red subpixel region R and the green subpixel region G may be contrived in the form non-enclosed ends, that is, openings 50 may be contrived at the end points (away from the first straight portions 51) of the second straight portions 52 of the adjustment electrodes 42, thereby improving the transmittances of the red subpixel region R and the green subpixel region G, compensating for the reduced transmittance with decrease in the voltage, and preventing the impact of reducing the voltage on the overall transmittance of the array substrate 100.

Moreover, since in the adjustment electrodes 42 corresponding to the red subpixel region R and the green subpixel region G, the angle θ2, between the extending direction of the second straight portion 52 and the second direction, is greater than the angle θ1, between the extending direction of the first straight portion 51 and the second direction, the response time of the red subpixel region R and the green subpixel region G can be expedited, the discrepancy in the response time, among the red subpixel region R, the green subpixel region G and the blue-green subpixel region 102, can be reduced, thus improving the artifacts of motion blur and discoloration in the existing technologies and enhancing the user experience.

It should be noted that the embodiments shown in FIGS. 14-17 only illustrate three different examples, where the pixel region 101 includes the three red, green, and blue subpixel regions 102. In the actual applications, according to requirements, a user can contrive the subpixel regions specifically corresponding to the adjustment-subpixel region 103 and the non-adjustment-subpixel region 104, which is not limited herein. When the pixel region 101 includes the four-color red, green, blue and white subpixel regions, according to the requirements, the user can also select which subpixel region to serve as the adjustment-subpixel region 103 or the non-adjustment-subpixel region 104, which is not limited herein either.

Figure 18:
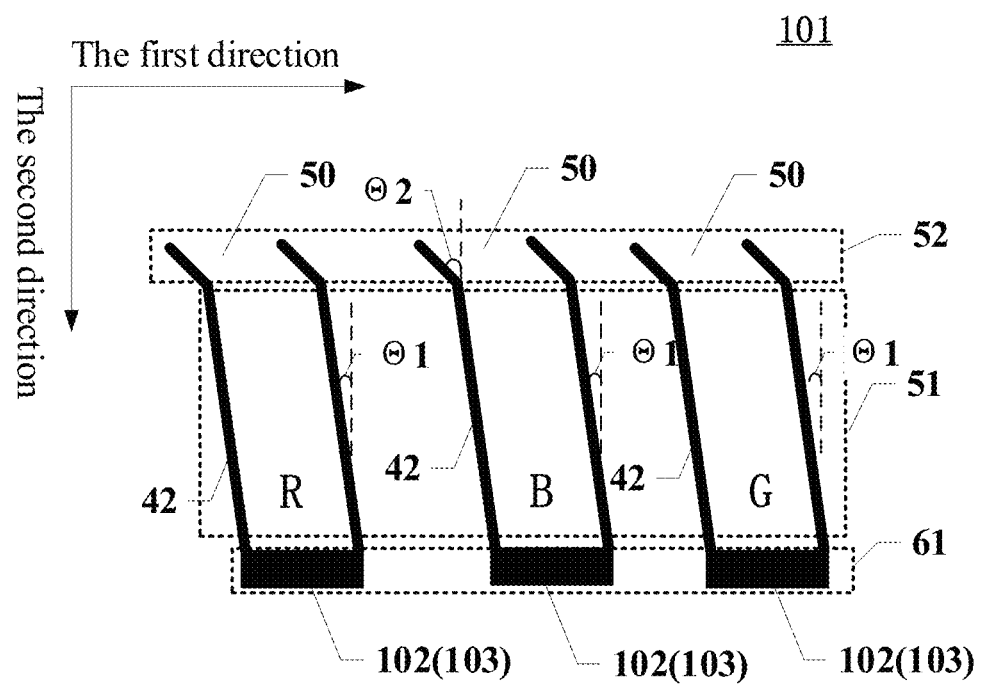
FIG. 18 illustrates another schematic structural diagram of an exemplary pixel region consistent with disclosed embodiments.
Figure 19:
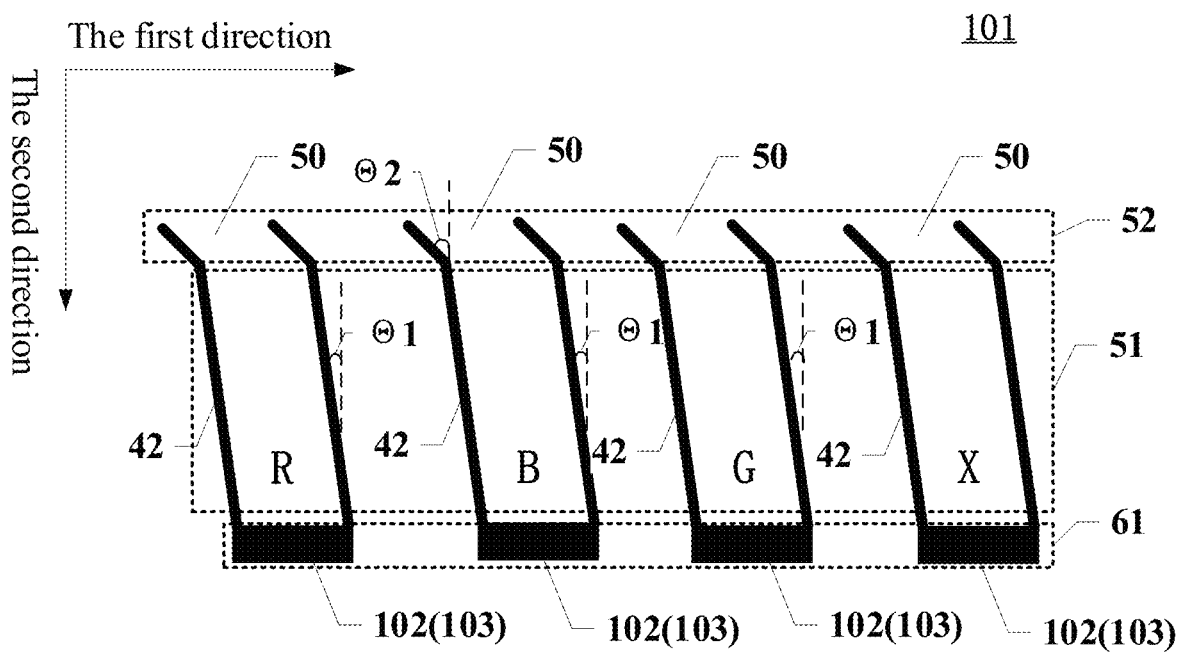
FIG. 19 illustrates another schematic structural diagram of an exemplary pixel region consistent with disclosed embodiments.

Optionally, FIG. 18 illustrates another schematic structural diagram of an exemplary pixel region consistent with disclosed embodiments, and FIG. 19 illustrates another schematic structural diagram of an exemplary pixel region consistent with disclosed embodiments. In the embodiments shown in FIG. 18 and FIG. 19, each of the subpixel regions 102 may serve as the adjustment subpixel region 103. The first electrode 41 corresponding to each of the subpixel regions 102 may serve as the adjustment electrode 42. An opening 50 may be configured at the end points (away from the first straight portions 51) of the second straight portions 52 in each of the adjustment electrodes 42. This design can improve the transmittance for each of the subpixel regions 102, thus improving the overall transmittance, and in turn enhancing the display effect of the array substrate 100.

Figure 20:
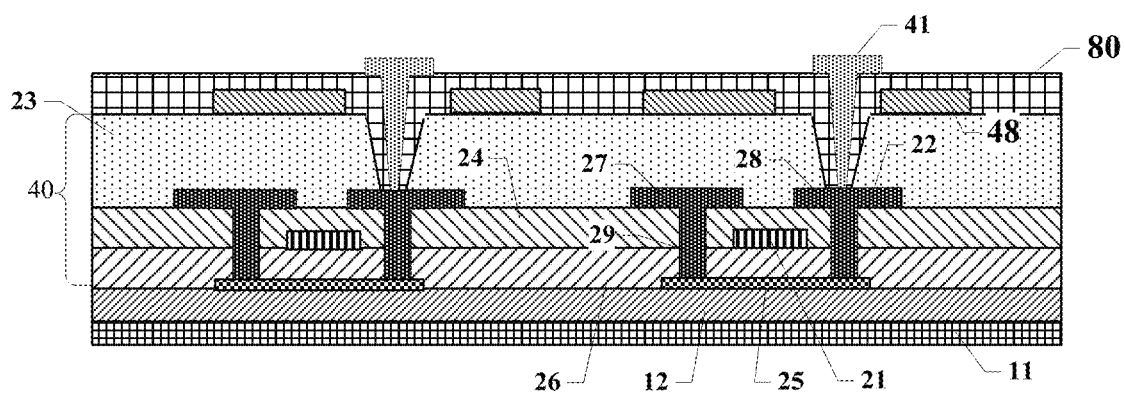
FIG. 20 illustrates a cross-sectional view of an exemplary array substrate consistent with disclosed embodiments.

Optionally, FIG. 20 illustrates a cross-sectional view of an exemplary array substrate consistent with disclosed embodiments. In one embodiment, the first electrode 41 may serve as a pixel electrode, and the array substrate 100 may further include a common electrode 48. The common electrode 48 and the pixel electrode 41 may be insulated by an insulating layer 80. Generally, the pixel electrode 41 and the common electrode 48 may be arranged to be opposite to each other. During displaying by the array substrate 100, the common electrode 48 may receive a first voltage and the pixel electrode may receive a second voltage. The voltage difference between the first voltage and the second voltage may serve as a driving voltage for driving the liquid crystal molecules to rotate. Referring to FIG. 20, the array substrate 100 consistent with the present disclosure may also include a first substrate 11, a buffer layer 12, and an array layer of thin-film transistors 40. The array layer of thin-film transistors 40 may include a semiconductor active layer 25 on the buffer layer 12. The semiconductor active layer 25 may include a source region and a drain region formed by doping N-type or P-type impurity ions. The region between the source region and the drain region is a channel region without being doped with impurity ions. The semiconductor active layer 25 may be formed by crystallizing amorphous silicon into polysilicon. To crystallize amorphous silicon, a wide range of methods to can be used, such as rapid thermal annealing (RTA), solid phase crystallization (SPC), excimer laser annealing (ELA), metal-induced crystallization (MIC), metal-induced lateral crystallization (MILC), continuous lateral solidification (SLS), etc.

A gate insulating layer 26 may be disposed on the semiconductor active, layer 25, and the gate insulating layer 26 may include one or more of inorganic layers, such as silicon oxide, silicon nitride, metal oxide, etc.

A first metal layer 21 may be disposed in a certain region on the gate insulating layer 26, and may serve as a gate electrode of the thin-film transistor. The gate electrode may include one or more layers of metal elements, such as gold (Au), silver (Ag), copper (Cu), nickel (Ni), platinum (Pt), palladium (Pd), aluminum (Al), molybdenum (Mo), chromium (Cr), etc. Alternatively, the gate electrode may include one or more layers of metal alloys, such as aluminum-neodymium (Al—Nd) molybdenum-tungsten (Mo—W) alloy, etc.

An inter-insulating layer 24 may be disposed on the first metal layer 21, and may be formed by an insulating inorganic layer such as silicon oxide, silicon nitride, etc. or formed by an insulating organic layer.

A second metal layer 22 may be disposed on the inter-insulating layer 24, and may serve as a source electrode 27 and a drain electrode 28 of the thin-film transistor. The source electrode 27 and the drain electrode 28 may be electrically connected through a contact hole 29 to the source region and the drain region of the semiconductor active layer 25, respectively. The contact hole 29 may be formed by selectively removing the gate insulating layer 26 and the inter-insulating layer 24.

A passivation layer 23 may be disposed on the second metal layer 22, and may be framed by the inorganic layer such as silicon oxide, silicon nitride, etc., or formed by the organic layer. The common electrode 48, the insulating layer 80, and the pixel electrode 41 may be configured on the side (away from the second metal layer 22) of the passivation layer 23.

It should be noted that the embodiments shown in FIG. 20 are illustrated by taking the thin-film transistor having a top-gate structure as an example. In other embodiments, the thin-film transistor may also have a bottom-gate structure.

Figure 21:
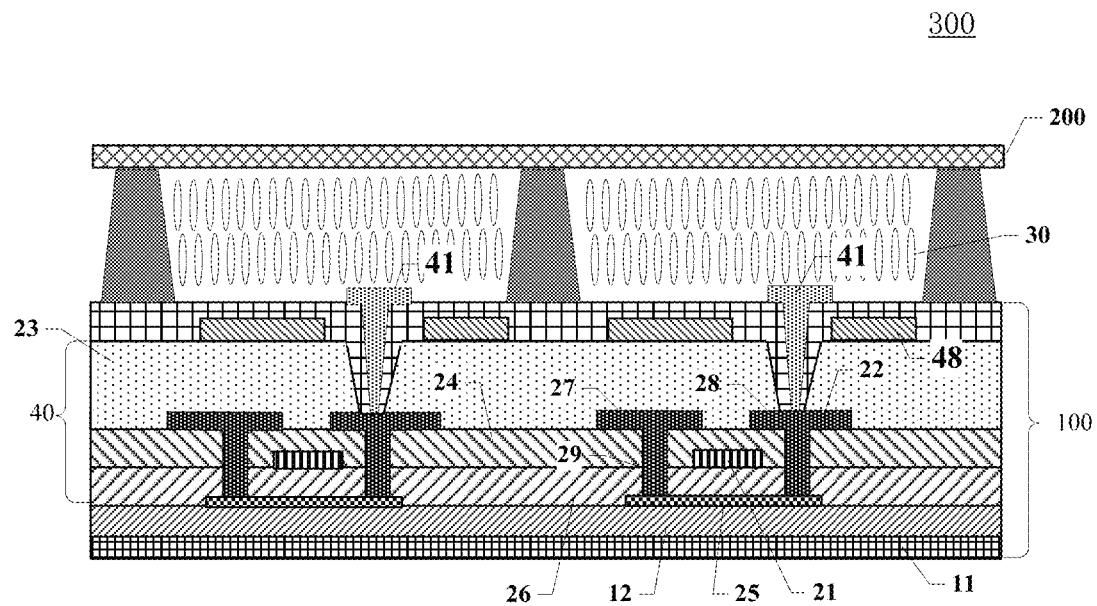
FIG. 21 illustrates a schematic structural diagram of an exemplary display panel consistent with disclosed embodiments.

In addition to the disclosed array substrate, the present disclosure also provides a display panel 300. FIG. 21 illustrates a schematic structural diagram of an exemplary display panel consistent with disclosed embodiments. The display panel 300 may include the array substrate 100 consistent with the present disclosure and a color-film substrate 200 opposite to the array substrate 100. The liquid crystal molecules 30 may be filled between the array substrate 100 and the color-film substrate 200. During displaying, driven by the driving voltage between the common electrode 48 and the pixel electrode 41, the liquid crystal molecules 30 are rotated, which allows the display panel 300 to display normally. It should be noted that the embodiments of the display panel 300 consistent with the present disclosure can refer to the foregoing embodiments of the array substrate 100, which are not repeated herein.

Figure 22:
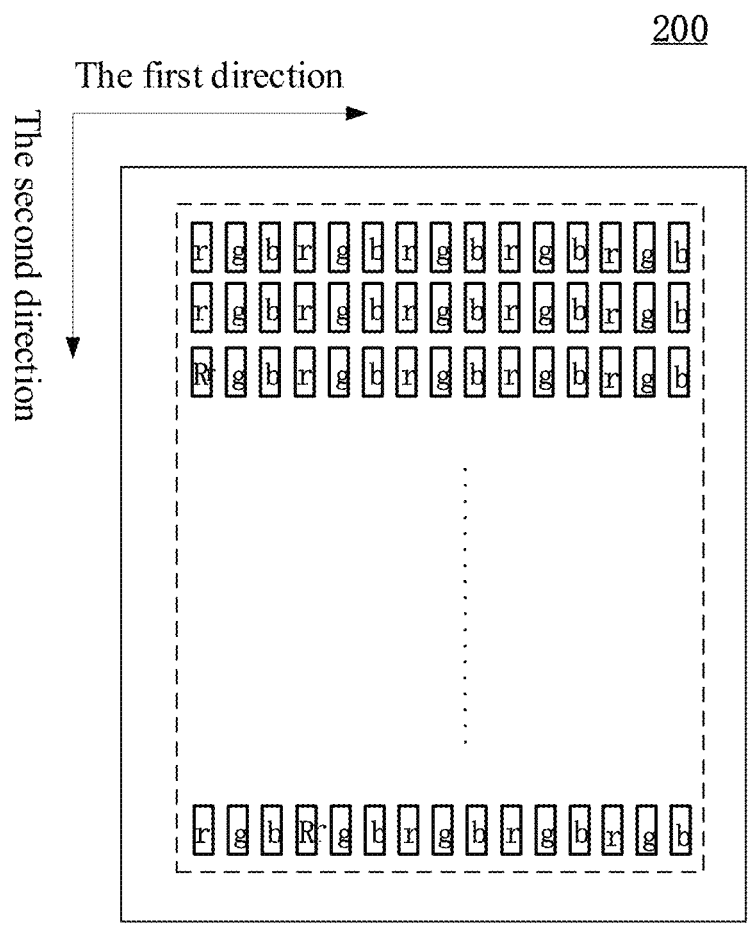
FIG. 22 illustrates a top view of an exemplary color-film substrate consistent with disclosed substrate.

Optionally, FIG. 22 illustrates a top view of an exemplary color-film substrate consistent with disclosed substrate. Referring to FIG. 1 and FIG. 22, the color-film substrate 200 may be configured with a plurality of red resistances r, blue resistances b and green resistances g. The array substrate 100 may be configured with the plurality of red subpixel regions R, blue subpixel regions B and green subpixel regions G. The red resistances r, the blue resistances b and the green resistances g may correspond to the red subpixel regions R, the blue subpixel regions B and the green subpixel regions G, respectively. During displaying by the display panel 300, the red resistances r, the blue resistances b and the green resistances g may cooperate with the red subpixel regions R, the blue subpixel regions B and the green subpixel regions G, respectively, to achieve the display for different pictures and colors on the display panel 300.

Figure 23:
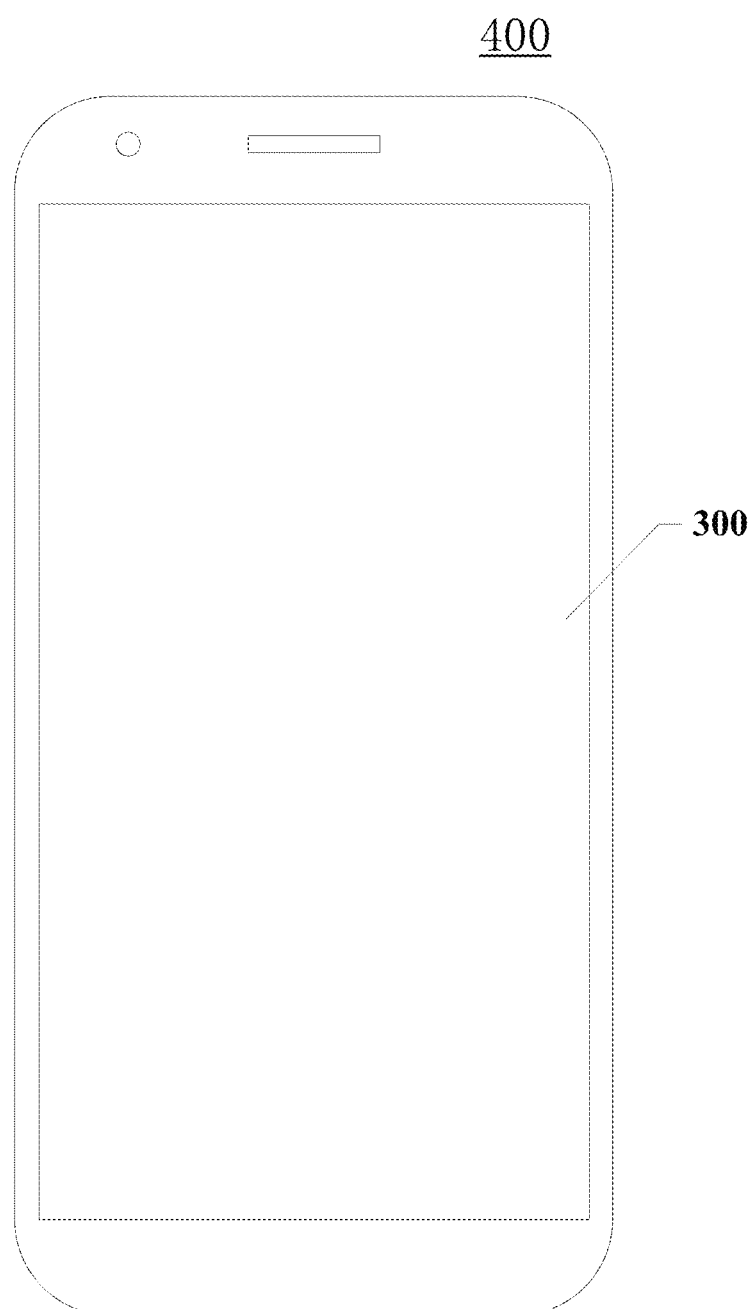
FIG. 23 illustrates a schematic structural diagram of an exemplary display device consistent with disclosed embodiments.

In addition to the disclosed array substrate and display panel, the present disclosure also provides a display device 400. FIG. 23 illustrates a schematic structural diagram of an exemplary display device consistent with disclosed embodiments. The display device 400 may include the display panel 300 consistent with the present disclosure. The display device 400 consistent with the present disclosure may be any products or components having a real function, such as a mobile phone, a tablet computer, a television, a monitor, a notebook computer, a digital photo frame, a navigator, etc. The embodiments of the display device 400 consistent with the present disclosure can refer to the foregoing embodiments of the display panel 300, which are not repeated herein.

As can be seen from the foregoing embodiments, the beneficial effects of the present disclosure includes: of the array substrate, the display panel and the display device consistent with the present disclosure, in the at least three subpixel regions included by each pixel region, at least one subpixel region may serve as the adjustment-subpixel region; an opening may be configured at the end points, away from the first straight portions, between the at least two adjacent second straight portions of the second straight portions corresponding to the adjustment electrode; and the angle $\theta 2$, between the extending direction of the second straight portion of the adjustment electrode and the second direction, may be set to be greater than the angle $\theta 1$, between the extending direction of the first, straight portion and the second direction. Such design can effectively prevent the decrease of transmittance, and meanwhile can speed up the pixel response time, lower the discrepancy in the response time among each subpixel, and improve the artifacts of motion blur and discoloration in the existing technologies.

The above description illustrates several disclosed embodiments of the present disclosure, but as previously described it should understood that the present disclosure is not limited to the forms disclosed herein. It should not be regarded as exclusions of other embodiments and may be used in various combinations, modifications, and environments, and it can be modified within the scope of the inventive conception described herein through the above instructions, or technologies or knowledge of related fields. Modifications and changes made by those skilled in the art without departing from the spirit and scope of the present disclosure shall all fail within the protection scope of the appended claims of the present disclosure.

What is claimed is:

1. An array substrate, comprising:
a plurality of pixel regions, arranged in an array along a first direction and a second direction, each of the pixel regions including at least three subpixel regions, among which at least one subpixel region serves as an adjustment-subpixel region and at least one subpixel region serves as a non-adjustment-subpixel region, each of the subpixel regions having a first electrode, and the first direction and the second direction intersected with each other, wherein:
each of the first electrodes includes at least two first straight portions parallel to each other, and second straight portions are respectively connected to each of the first straight portions, and the first electrode corresponding to the adjustment-subpixel region serves as an adjustment electrode;
each of the second straight portions is parallel to each other, and is disposed at a first end of each of the first straight portions;
a second end of each of the first straight portions is connected with a first connecting portion;
an opening is configured at an end, away from the first straight portions, between the at least two adjacent second straight portions of the second straight portions corresponding to the adjustment electrode;
the first electrode corresponding to the non-adjustment-subpixel region serves as a non-adjustment electrode; and
an angle $\theta 1$ between an extending direction of the first straight portion and the second direction and an angle $\theta 3$ between the extending direction of the second straight portion of the non-adjustment electrode and the second direction are both less than an angle $\theta 2$ between an extending direction of the second straight portion of the adjustment electrode and the second direction.

2. The array substrate according to claim 1, wherein approximately:
$6° \leq \theta 1 \leq 14°$ and $\theta 2 > 14°$.

3. The array substrate according to claim 2, wherein approximately:
$\theta 2 = 20°$.

4. The array substrate according to claim 1, wherein a length of the second straight portions of the adjustment electrode is D, and approximately $3\ \mu m \leq D \leq 8\ \mu m$.

5. The array substrate according to claim 4, wherein approximately:
D=5 μm.

6. The array substrate according to claim 1, wherein among the second straight portions corresponding to any of the adjustment electrodes, the opening is configured at the endpoints, away from the first straight portions, between any two of the adjacent second straight portions.

7. The array substrate according to claim 1, wherein approximately:
θ3=θ1.

8. The array substrate according to claim 1, wherein each of the second straight portions of the non-adjustment electrode is connected with a second connecting portion.

9. The array substrate according to claim 1, wherein the pixel region includes at least a red subpixel region, a blue subpixel region, and a green subpixel region.

10. The array substrate according to claim 9, wherein the pixel region further includes a white subpixel region serving as an adjustment-subpixel region.

11. The array substrate according to claim 9, wherein the pixel region includes at least one adjustment-subpixel region and at least one non-adjustment-subpixel region.

12. The array substrate according to claim 11, wherein the blue subpixel region serves as the adjustment-subpixel region, and the red subpixel region and the green subpixel region serve as the non-adjustment-subpixel regions.

13. The array substrate according to claim 11, wherein the blue subpixel region and the green subpixel region serve as the adjustment-subpixel regions, and the red subpixel region serves as the non-adjustment-subpixel region.

14. The array substrate according to claim 11, wherein the red subpixel region and the green subpixel region serve as the adjustment-subpixel regions, and the blue subpixel region serves as the non-adjustment-subpixel region.

15. The array substrate according to claim 9, wherein each of the subpixel regions serves as the adjustment-subpixel region.

16. The array substrate according to claim 1, wherein the first electrode is a pixel electrode, the array substrate further includes a common electrode, and the common electrode and the pixel electrode are insulated by an insulating layer.

17. A display panel, comprising:
a color-film substrate; and
an array substrate, arranged to be opposite to the color-film substrate, wherein the array substrate comprises:
a plurality of pixel regions, arranged in an array along a first direction and a second direction, each of the pixel regions including at least three subpixel regions, among which at least one subpixel region serves as an adjustment-subpixel region and at least one subpixel region serves as a non-adjustment-subpixel region, each of the subpixel regions having a first electrode, and the first direction and the second direction intersected with each other,
wherein:
each of the first electrodes includes at least two first straight portions parallel to each other, and second straight portions are respectively connected to each of the first straight portions, and the first electrode corresponding to the adjustment-subpixel region serves as an adjustment electrode;
each of the second straight portions is parallel to each other, and is disposed at a first end of each of the first straight portions;
a second end of each of the first straight portions is connected with a first connecting portion;
an opening is configured at an end, away from the first straight portions, between the at least two adjacent second straight portions of the second straight portions corresponding to the adjustment electrode;
the first electrode corresponding to the non-adjustment-subpixel region serves as a non-adjustment electrode; and
an angle θ1 between an extending direction of the first straight portion and the second direction and an angle θ3 between the extending direction of the second straight portion of the non-adjustment electrode and the second direction are both less than an angle θ2 between an extending direction of the second straight portion of the adjustment electrode and the second direction.

18. The display panel according to claim 17, wherein:
a red resistance, a blue resistance, and a green resistance are configured on the color-film substrate;
a red subpixel region, a blue subpixel region and a green subpixel region are configured on the array substrate; and
the red resistance, the blue resistance, and the green resistance correspond to the red subpixel region, the blue subpixel region, and the green subpixel region, respectively.

19. A display device, comprising:
a display panel, including a color-film substrate and an array substrate arranged to be opposite to the color-film substrate, wherein the array substrate comprises:
a plurality of pixel regions, arranged in an array along a first direction and a second direction, each of the pixel regions including at least three subpixel regions, among which at least one subpixel region serves as an adjustment-subpixel region and at least one subpixel region serves as a non-adjustment-subpixel region, each of the subpixel regions having a first electrode, and the first direction and the second direction intersected with each other,
wherein:
each of the first electrodes includes at least two first straight portions parallel to each other, and second straight portions are respectively connected to each of the first straight portions, and the first electrode corresponding to the adjustment-subpixel region serves as an adjustment electrode;
each of the second straight portions is parallel to each other, and is disposed at a first end of each of the first straight portions;
a second end of each of the first straight portions is connected with a first connecting portion;
an opening is configured at an end, away from the first straight portions, between the at least two adjacent second straight portions of the second straight portions corresponding to the adjustment electrode;
the first electrode corresponding to the non-adjustment-subpixel region serves as a non-adjustment electrode; and
an angle θ1 between an extending direction of the first straight portion and the second direction and an angle θ3 between the extending direction of the second straight portion of the non-adjustment electrode and the second direction are both i-s-less than an angle θ2 between an extending direction of the second straight portion of the adjustment electrode and the second direction.

\* \* \* \* \*